United States Patent
Venkataraman et al.

(10) Patent No.: US 10,204,092 B2
(45) Date of Patent: Feb. 12, 2019

(54) METHOD AND SYSTEM FOR AUTOMATICALLY UPDATING AUTOMATION SEQUENCES

(71) Applicant: Wipro Limited, Bangalore (IN)

(72) Inventors: Arthi Venkataraman, Bangalore (IN); Aman Chandra, Bangalore (IN); Arvind Patter, Bangalore (IN); Venkata Prasad, Bangalore (IN)

(73) Assignee: Wipro Limited, Bangalore (IN)

( * ) Notice: Subject to any disclaimer, the term of this patent is extended or adjusted under 35 U.S.C. 154(b) by 3 days.

(21) Appl. No.: 15/419,400

(22) Filed: Jan. 30, 2017

(65) Prior Publication Data

US 2018/0165264 A1    Jun. 14, 2018

(30) Foreign Application Priority Data

Dec. 12, 2016 (IN) .............................. 201641042392

(51) Int. Cl.
| | | |
|---|---|---|
| *G06F 17/24* | (2006.01) | |
| *G06F 8/65* | (2018.01) | |
| *G06F 8/71* | (2018.01) | |
| *G06F 17/27* | (2006.01) | |
| *G06N 99/00* | (2010.01) | |
| *G06F 11/36* | (2006.01) | |
| *G06T 1/00* | (2006.01) | |

(52) U.S. Cl.
CPC .............. *G06F 17/243* (2013.01); *G06F 8/65* (2013.01); *G06F 8/71* (2013.01); *G06F 17/2785* (2013.01); *G06N 99/005* (2013.01); *G06F 11/3668* (2013.01); *G06T 1/00* (2013.01)

(58) Field of Classification Search
CPC .. G06F 17/243; G06F 17/2785; G06N 99/005
USPC ........................................ 715/221, 243, 273
See application file for complete search history.

(56) References Cited

U.S. PATENT DOCUMENTS

| | | | | |
|---|---|---|---|---|
| 6,367,077 | B1 * | 4/2002 | Brodersen ................. | G06F 8/65 |
| | | | | 717/170 |
| 7,421,683 | B2 | 9/2008 | Robertson et al. | |
| 7,559,016 | B1 * | 7/2009 | Rakowski ............... | G06F 9/452 |
| | | | | 715/229 |
| 8,132,114 | B2 * | 3/2012 | Grechanik ................ | G06F 8/38 |
| | | | | 702/20 |
| 8,365,147 | B2 * | 1/2013 | Grechanik ................ | G06F 8/70 |
| | | | | 714/37 |

(Continued)

FOREIGN PATENT DOCUMENTS

EP     2096536 A2    9/2009

*Primary Examiner* — Andrew R Dyer
(74) *Attorney, Agent, or Firm* — LeClairRyan PLLC (57) ABSTRACT

A technique is provided for automatically updating automation sequences. The technique includes automatically identifying a difference between a current image of a screen of a graphical user interface (GUI) application and a baseline image of the screen of the GUI application, based on one or more image comparison techniques. Each of the current image and the baseline image include one or more fields. The technique further includes determining a change in one or more fields of the current image and the one or more corresponding fields of the baseline image, based on the identified difference. The change is based on one or more similarity scores. The technique further includes updating one or more automation sequences based on the determined change.

14 Claims, 4 Drawing Sheets

Method 300 for automatically updating automation sequences (56) References Cited

U.S. PATENT DOCUMENTS

| | | | | |
|---|---|---|---|---|
| 8,516,442 B2 * | 8/2013 | Grechanik | G06F 8/38 | 715/229 |
| 8,549,480 B2 * | 10/2013 | Cohen | G06F 11/368 | 717/113 |
| 8,751,464 B1 * | 6/2014 | Weiss | G06Q 10/10 | 707/695 |
| 8,849,612 B2 * | 9/2014 | Slothouber | G06F 8/38 | 702/182 |
| 8,850,395 B2 * | 9/2014 | Mishra | G06F 11/3696 | 715/762 |
| 8,954,933 B2 * | 2/2015 | Bullard | G06F 11/368 | 717/125 |
| 8,990,774 B2 * | 3/2015 | Amintafreshi | G06F 11/3692 | 715/772 |
| 9,038,029 B2 * | 5/2015 | Chaturvedi | G06F 11/368 | 717/124 |
| 9,417,994 B2 * | 8/2016 | Ellis | G06F 11/3684 | |
| 9,424,167 B2 * | 8/2016 | Lee | G06F 11/3664 | |
| 9,448,915 B2 * | 9/2016 | Brown | G06F 11/3664 | |
| 9,459,846 B2 * | 10/2016 | Bornheimer | G06F 8/77 | |
| 9,767,009 B2 * | 9/2017 | Cobb, Jr. | G06F 11/3688 | |
| 2008/0195377 A1 * | 8/2008 | Kato | G06F 17/2836 | 704/8 |
| 2009/0217302 A1 * | 8/2009 | Grechanik | G06F 8/70 | 719/320 |
| 2014/0068470 A1 * | 3/2014 | DiVita | G06F 3/0481 | 715/762 |
| 2015/0082280 A1 | 3/2015 | Betak et al. | | |
| 2015/0269721 A1 * | 9/2015 | Bartley | G06F 17/212 | 715/762 |
| 2015/0286556 A1 * | 10/2015 | Ellis | G06F 11/3684 | 717/125 |
| 2015/0339213 A1 * | 11/2015 | Lee | G06F 11/3664 | 717/125 |
| 2016/0019049 A1 | 1/2016 | Kakhandiki et al. | | |
| 2017/0277374 A1 * | 9/2017 | Ozcan | G06F 3/0484 | |
| 2017/0277625 A1 * | 9/2017 | Shtuchkin | G06F 11/3688 | |
| 2018/0107580 A1 * | 4/2018 | Zhang | G06F 11/3604 | |

* cited by examiner

FIG. 1: System Environment 100

FIG. 2: Electronic Device 102

FIG. 3: Method 300 for automatically updating automation sequences

FIG. 4: Example Computer System

METHOD AND SYSTEM FOR
AUTOMATICALLY UPDATING
AUTOMATION SEQUENCES

This application claims the benefit of Indian Patent Application Serial No. 201641042392 filed Dec. 12, 2016, which is hereby incorporated by reference in its entirety.

FIELD

This disclosure relates generally to automation sequences, and more particularly to system and method for automatically updating automation sequences.

BACKGROUND

Advancements in the field of software engineering have led to development of various tools for automated testing of the graphical user interface (GUI) applications. The existing automated testing tools are based on automation scripts which are essentially a set of instructions pre-recorded into the system. Typically, such automation scripts comprise a set of instructions in standard languages, such as PYTHON, JAVA, or R programming. The set of instructions may be recorded by the system and played back when testing of the GUI application is to be performed. As an example, based on the aforementioned set instructions, one or more actions may be performed on objects present in a user interface associated with the GUI applications. In another example, snipping of an object tree or a document object model (DOM) tree may be performed based on the aforementioned set of instructions. The aforementioned automation scripts are usually stored and maintained for repeated testing of the GUI application for regression purposes.

Typically, in software development life cycle, the GUI application may undergo periodic and frequent changes based on design updates, changing requirements, or bug fixes. The aforementioned updated may lead to changes in the user interface of the user interface of the GUI application. Such a change of the user interface may entail addition of fields, deletion of fields, semantic change to the fields, layout change of the fields, and the like. As a result of such changes, the stored automation scripts may be rendered useless as the scenarios being tested may fail because of the changes user interface. To overcome the aforementioned difficulty, it is imperative to manually update the automation scripts according to the change made to the user interface of the GUI application. The issue is compounded further when the number of the automation scripts is high, as it is very time consuming and resource intensive process to maintain the automation scripts manually.

It is therefore desirable to provide a mechanism for updating the automation scripts based on the change in the user interface of the GUI application. It is also desirable that such a mechanism includes enhanced usability aspects that enable the patient to conveniently navigate the entire menu based on a limited set of gestures.

SUMMARY

In one embodiment, a method for automatically updating automation sequences is disclosed. In one example, the method includes automatically identifying a difference between a current image of a screen of a graphical user interface (GUI) application and a baseline image of the screen of the GUI application. The identification may be based on one or more image comparison techniques. Further, each of the current image and the baseline image include one or more fields. The method further includes determining a change in the one or more fields of the current image and the one or more corresponding fields of the baseline image, based on the identified difference. The change may be based on one or more similarity scores. The method further includes updating one or more automation sequences based on the determined change.

In another embodiment, a system of automatically updating automation sequences is disclosed. The system includes a processor and a memory communicatively coupled to the processor. The memory stores processor-executable instructions, which, on execution, cause the processor to automatically identify a difference between a current image of a screen of a graphical user interface (GUI) application and a baseline image of a screen of the GUI application. The identification may be based on one or more image comparison techniques. Further, each of the current image and the baseline image include one or more fields. The processor-executable instructions, on execution, further cause the processor to determine a change in the one or more fields of the current image and the one or more corresponding fields of the baseline image, based on the identified difference. The change may be based on one or more similarity scores. The processor-executable instructions, on execution, further cause the processor to update one or more automation sequences based on the determined change.

In yet another embodiment, a non-transitory computer-readable medium storing computer-executable instructions for automatically updating one or more automation sequences is disclosed. In one example, the stored instructions, when executed by a processor, cause the processor to perform operations including automatically identifying a difference between a current image of a screen of a graphical user interface (GUI) application and a baseline image of the screen of the GUI application. The identification may be based on one or more image comparison techniques. Further, each of the current image and the baseline image include one or more fields. The operations further include determining a change in the one or more fields of the current image and the one or more corresponding fields of the baseline image, based on the identified difference. The change may be based on one or more similarity scores. The operations further include updating one or more automation sequences based on the determined change.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
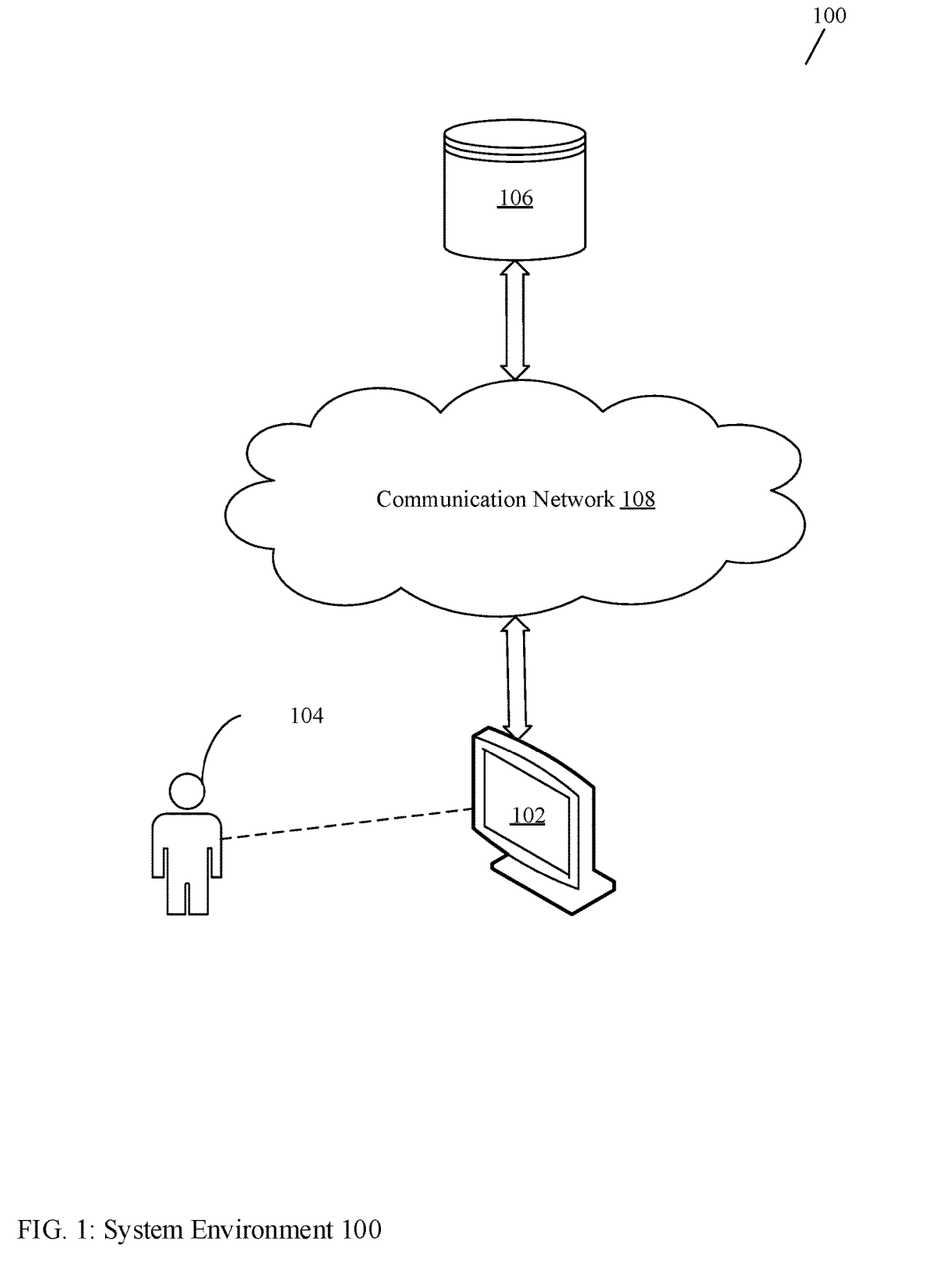
FIG. 1 is a block diagram of an exemplary network environment for automatically updating automation sequences over a communication network, in accordance with some embodiments of the present disclosure.

Referring now to FIG. 1, an exemplary network environment 100 for automatically updating automation sequences, is illustrated in accordance with some embodiments of the present disclosure. As will be described in greater detail in conjunction with FIG. 2, the network environment 100 displays an electronic device 102 on which a graphical user interface (GUI) application may be installed, a user 104 that may perform one or more operations using the GUI application, an automation sequence database 106, and a communication network 108. In an embodiment, a version identifier may be associated with the installed GUI application.

The network environment 100 includes a network of computing devices (for example, a computer, a server, a digital device, a router, a modem, a bridge, a switch, etc.) for sending or receiving various data between the electronic device 102 and the automation sequence database 106. In one embodiment, the network environment 100 includes a user 104 that may be associated electronic device 104. The electronic device 102 and the automation sequence database 106 may be in communication with each other over a communication network 108. A person of ordinary skill in the art will appreciate that the in one implementation the automation sequence database 106 may be integrated with the electronic device 102, whereas in another implementation, the automation sequence database 106 may be a remote entity as depicted in FIG. 1.

Further, each of the computing devices further includes one or more processors and a computer-readable medium (for example, a memory). The computer-readable storage medium stores instructions that, when executed by the one or more processors, cause the one or more processors to perform data reception and transmission in accordance with aspects of the present disclosure. The computer-readable storage medium may also store various data (for example, optimal network path, optimal packet size, data packets, current packet size of a node, and the like) that may be captured, processed, and/or required by the network environment 100.

In an embodiment, the electronic device 102 may include suitable logic, circuitry, interfaces, and/or code for displaying one or more user interfaces (screens) of the GUI application. The one or more screens may correspond to various views of the GUI application corresponding to various operations and functionalities included in the GUI application. The electronic device 102 may be configured to capture images of all the unique screens of the GUI application. The electronic device 102 may be further configured to generate a baseline image for each screen of the GUI application. In an embodiment, the baseline image is generated based on processing a unique screen of the GUI application to extract one or more fields from the unique screen. Further, the data associated with the extracted one or more fields may be stored in an image database associated with the electronic device 102.

In an embodiment, the electronic device 102 may record one or more actions performed by the user 104 on the screens of the GUI application. The electronic device 102 may further record the state of the one or more screens before and after the user 104 performs the one or more actions. Such a record of the one or more actions and the screen states may correspond to one or more automation sequences. In an embodiment, the one or more automation sequences may include, but are not limited to, a set of actions performed on one or more fields of the GUI application, a set of pre-conditions of the one or more fields on which the one or more actions are performed, a set of post-conditions of the GUI application after the one or more actions are performed. The electronic device 102 may store the one or more automation sequences in the automation sequence database 106.

In an embodiment, the one or more automation sequences may be communicated to the automation sequence database 106, via the communication network 108. In an embodiment, the communication network 108 may include a medium through which the electronic device 102 and the automation sequence database 106 present in the network environment 100 may communicate with each other. Examples of the communication network 108 may include, but are not limited to, the Internet, a cloud network, a Wireless Fidelity (Wi-Fi) network, a Wireless Local Area Network (WLAN), a Local Area Network (LAN), a telephone line (POTS), Long Term Evolution (LTE), and/or a Metropolitan Area Network (MAN). Various devices in the exemplary network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZIGBEE, EDGE, infrared (IR), IEEE 802.11, 802.16, cellular communication protocols, and/or Bluetooth (BT) communication protocols.

In an embodiment, the electronic device 102 may track the version identifier associated with the GUI application. Such a version identifier may enable the electronic device 102 to detect a change in the version of the installed GUI application. This may in turn enable the electronic device 102 to determine if there is a change in the one or more screens of the GUI application. In an embodiment, information regarding the change in version identification of the GUI application may be provided by the user 104 manually, for example, in scenarios when a new version of the GUI application is deployed on the electronic device 102. The electronic device 102 may capture images of all the unique screens of the GUI application, having changed version identifier (hereinafter, updated GUI application). The electronic device 102 may be further configured to generate a current image for each screen of the updated GUI application. In an embodiment, the current image may be generated based on processing a unique screen of the updated GUI application to extract one or more fields from the unique screen. Further, the data associated with the extracted one or more fields may be stored in an image database associated with the electronic device 102.

Based on the changed version identifier, the electronic device 102 may automatically identify a difference between a current image of a screen of a graphical user interface (GUI) application and a baseline image of the screen of the GUI application. In an embodiment, the aforementioned identification may be based on one or more image comparison techniques. A person of ordinary skill in the art will appreciate that just like the baseline image, the current image may also include one or more fields, such that one or more fields of the current mage may correspond to the corresponding fields of the baseline image.

The electronic device 102 may determine a change in one or more fields of the baseline image (with respect to the current image). The change may be determined based on at least the identified difference between the baseline image and the current image. In order to determine the change, the electronic device 102 may correlate data associated with the one or more fields of the current image and the stored data associated with the one or more fields of the baseline image. In an embodiment, the change corresponds to at least one of a change in a resolution of the screen of the GUI application, an addition of one or more fields to the screen of the GUI application, a deletion of one or more fields from the screen of the GUI application, a change in a spatial arrangement of one or more fields of the screen of the GUI application, a semantic change of one or more fields of the screen of the GUI application.

The determination of the change may be further based on one or more similarity scores. Such similarity scores may be indicative of a degree of similarity between the baseline image and the current image. In an embodiment, the one or more similarity scores include a spatial similarity score and a semantic similarity score. The semantic similarity score may be indicative of a similarity in the semantics of the one or more fields of the baseline image and the current image. Similarly, the spatial similarity score may be indicative of similarity in the spatial distribution of the one or more fields in the baseline image and the current image.

The electronic device 102 may further update the one or more automation sequences based on the determined change. In an embodiment, the aforementioned updation may be performed based on a comparison of a pre-defined similarity threshold with the one or more similarity scores. In an embodiment, the each of the similarity scores may be individually compared with a corresponding pre-defined similarity threshold. For example, a pre-defined spatial similarity threshold may be compared with a spatial similarity threshold, and a pre-defined semantic similarity threshold may be compared with the semantic similarity score. The electronic device 102 may perform a weighted analysis of the individual comparison to determine whether one or more fields of the baseline image have changed with respect to the one or more fields in the current image.

In an embodiment, the electronic device 102 may be further configured to recommend, to the user 104, one or more updates corresponding to the one or more automation sequences, based on the determined change. The user 104 may subsequently update the one or more automation sequences accordingly, and the updated changes may be stored in the automation sequence database 106. In an embodiment, the electronic device 102 may further perform a machine learning on the feedback provided by the user 104, corresponding to the recommendations. Based on the machine learning of a particular kind of a change identified by the electronic device 102, and the feedback provided by the user 104 corresponding to the recommended updates, the electronic device 102 may not recommend the updates that need to be made to the one or more automation sequences corresponding to one or more change that are similar to the identified change. Instead, the electronic device 102 may update the one or more automation sequence automatically based on gathered intelligence.

It should be noted that the various modules described above may be implemented in programmable hardware devices such as programmable gate arrays, programmable array logic, programmable logic devices, and so forth. Alternatively, the various modules described above may be implemented in software for execution by various types of processors. An identified module of executable code may, for instance, include one or more physical or logical blocks of computer instructions which may, for instance, be organized as an object, procedure, function, engine, or other construct. Nevertheless, the executables of an identified module need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for transmitting data over a communication network. For example, the exemplary network environment 100 may transmit data over a communication network by the processes discussed herein. In particular, as will be appreciated by those of ordinary skill in the art, control logic and/or automated routines for performing the techniques and steps described herein may be implemented by the network environment 100, either by hardware, software, or combinations of hardware and software. For example, suitable code may be accessed and executed by the one or more processors on the network environment 100 to perform some or all of the techniques described herein. Similarly, application specific integrated circuits (ASICs) configured to perform some or all of the processes described herein may be included in the one or more processors on the network environment 100.

Figure 2:
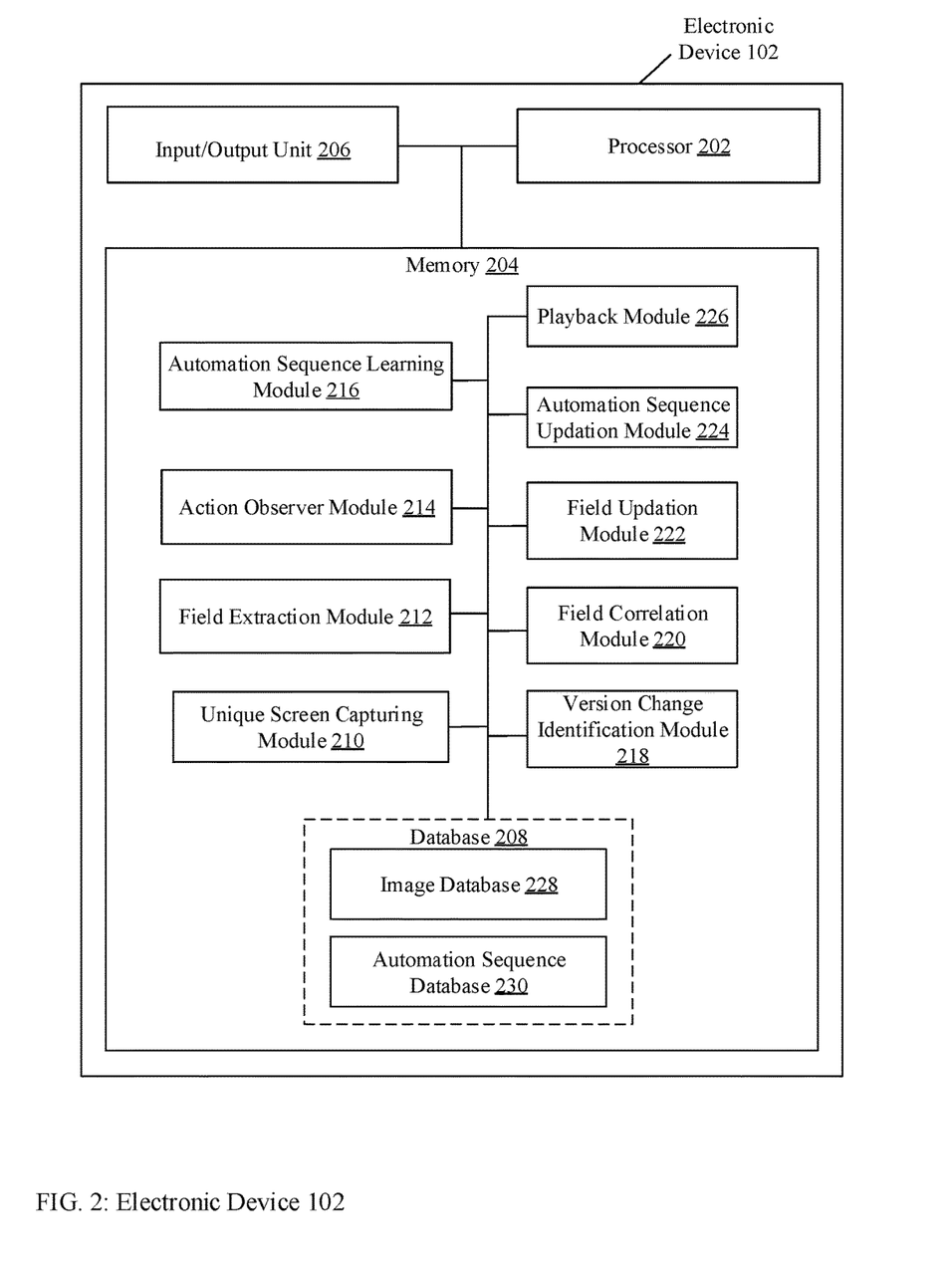
FIG. 2 is a block diagram of exemplary system for automatically updating automation sequences, in accordance with some embodiments of the present disclosure.

FIG. 2 is a block diagram of exemplary system for automatically updating automation sequences, in accordance with some embodiments of the present disclosure. FIG. 2 is explained in conjunction with elements from FIG. 1. With reference to FIG. 2, there is shown the electronic device 102. The electronic device 102 may include one or more processors, such as a processor 202, a memory 204, and an input/output (I/O) unit 206. The processor 202 may be communicatively coupled to the memory 204, and the I/O unit 206. In an implementation, the electronic device 102 may be communicatively coupled to the one or more remote databases, such as the automation sequence database 106, through the communication network 108. In an implementation, the database may be integrated into the electronic device 102 as a part of the memory 204, in the form of a database 208.

The processor 202 may include suitable logic, circuitry, interfaces, and/or code that may be configured to execute a set of instructions stored in the memory 204. The processor 202 may be configured to identify changes to the GUI application and update the one or more automation sequences based on the identified changes. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may include suitable logic, circuitry, and/or interfaces that may be configured to store a machine code and/or a computer program with at least one code section executable by the processor 202. In an embodiment, the memory 204 may include the modules such as a unique screen capturing module 210, a field extraction module 212, an action observer module 214, a automation sequence learning module 216, a version change identification module 218, a field correlation module 220, a field updation module 222, a automation sequence updation module 224, a playback module 226. Each of the aforementioned modules may include a plurality of instructions for performing tasks corresponding to the module (explained in detail in the following description). The memory 204 may further include the database 208 that may in turn include an image database 228 and an automation sequence database 230. The memory may be further configured to store one or more configurable parameters that include, but are not limited to, a spatial similarity threshold and a semantic similarity threshold. Examples of implementation of the memory 204 may include, but are not limited to, Random Access Memory (RAM), Read Only Memory (ROM), Hard Disk Drive (HDD), and/or a Secure Digital (SD) card.

The I/O unit 206 may include suitable logic, circuitry, interfaces, and/or code that may be configured to track the actions performed by a user, such as the user 104, on the GUI application. The I/O unit 206 may be further configured to communicate the tracked actions to the processor 202 for recording the actions as automation sequences. The I/O unit 206 may be further configured to display one or more recommendations for updating the recorded one or more automation sequences, based on the change in the GUI application.

In operation, the processor 202 may be configured to instruct the unique screen capturing module 210 to capture images of all the unique screens of the installed GUI application. The processor 202 may be further configured to generate a baseline image for each screen of the GUI application. In an embodiment, the baseline image is generated based on processing a unique screen of the GUI application to extract one or more fields from the unique screen. The processor may instruct the field extraction module 212 to extract data from the one or more fields of the baseline image. The field extraction module 212 may be configured to store the extracted data of the one or more fields in an image database 228, of the database 208. In an embodiment, the field extraction module 212 may be configured to store the extracted data in the form of comma separated value (CSV) file format.

In an embodiment, the processor 202 may instruct the action observer module 214 to track and record one or more actions performed by the user 104 on the screens of the GUI application. The action observer module 214 may be configured to record the state of the one or more screens before and after the user 104 performs the one or more actions. The action observer module 214 may include an action observer application. The actions recorded by the action observer module 214 include, but are not limited to, a keypress, one or more button clicks, one or more mouse clicks, and the like. Furthermore, the action observer module 214 may be configured to associate the recorded one or more actions with the relevant fields on which the one or more actions are performed. As an example, the relevant fields may correspond to application name, screen, actual key pressed, location of key press, timestamps, agent performing the action, and the like. All the relevant fields associated with each action are captured by action logging clients (included in the action observer module 214) in form of string. For example a sample string may be of the following form:

27183923|Calculator|KEY_PRESS|D0|image|Static||0|0|197452||calc.exe|C:\Win where, the "|" separated values may correspond to one or more parameters required by the processor 202 for identifying the relevant fields associated with each action.

In an embodiment, the record of the one or more actions and the screen states may be communicated to the automation sequence learning module 216 for further processing. The automation sequence learning module 216 may be configured to perform learning on the one or more actions and store them as one or more automation sequences, in the automation sequence database 230. In an embodiment, the one or more automation sequences may include, but are not limited to, a set of actions performed on one or more fields of the GUI application, a set of pre-conditions of the one or more fields on which the one or more actions are performed, a set of post-conditions of the GUI application after the one or more actions are performed.

In an embodiment, the processor 202, based on the version change identification module 218, may be configured to track a version identifier associated with the GUI application. Based on the version identifier, the version change identification module 218 may detect a change in the version of the installed GUI application. Such a version change may be automatically detected when a deployment of a software build, having a different version of the GUI application, is performed in the electronic device 102. In an embodiment, information regarding the change in version identification of the GUI application may be provided by the user 104 manually, for example, in scenarios when a deployment of a software build, having a different version of the GUI application, is performed.

The detection of a changed version of the GUI application enables the processor 202 to determine whether there is a change in the one or more screens of the GUI application. The processor 202, based on the unique screen capturing module 210, may capture images of all the unique screens of the GUI application, having changed version identifier (hereinafter, updated GUI application). The unique screen capturing module 210 may be further configured to generate a current image for each screen of the updated GUI application. The unique screen capturing module 210, in conjunction with the field extraction module 212, may be configured to generate a current image based on processing unique screens of the updated GUI application. Based on the processing, one or more fields may be extracted from the unique screens of the updated GUI application. Further, the data associated with the extracted one or more fields may be stored in an image database 228.

Based on the changed version identifier, the processor 202, by use of the field correlation module 220, may be configured to automatically identify a difference between a current image of a screen of a graphical user interface (GUI) application and a baseline image of the screen of the GUI application. A person of ordinary skill in the art will appreciate that just like the baseline image, the current image may also include one or more fields, such that one or more fields of the current mage may correspond to the corresponding fields of the baseline image. In an embodiment, the aforementioned identification may be based on one or more image comparison techniques, known in the art. Additionally, the field correlation module 220 may be configured to refer to the stored CSV files corresponding to the baseline image and the CSV file generated corresponding to the current image. In an alternate embodiment, the field correlation module 220 may be configured to use a combination of the aforementioned image comparison techniques and the CSV files to determine a difference between the baseline image and the current image of the GUI application.

In an embodiment, the identified differences may be based on a change in a resolution of the screen of the GUI application, an addition of one or more fields to the screen of the GUI application, a deletion of one or more fields from the screen of the GUI application, a change in a spatial arrangement of one or more fields of the screen of the GUI application, a semantic change of one or more fields of the screen of the GUI application. The identification of the one or more aforementioned differences may be based on a semantic correlation and a spatial correlation.

Based on the identified differences, the processor 202, in conjunction with the field updation module 222 may be configured to update the screen understanding. In an embodiment, the updates may be performed in the CSV files associated with the current image. Further, the updates may correspond to the various changes discussed in the foregoing disclosure. Based on the updated screen understanding, the automation sequence updation module 224 may be configured to update the relevant portions of the stored one or more automation sequences.

With respect to the identification of the various changes to the GUI application discussed above, the field correlation module 220 may use one or more of pre-defined similarity thresholds. In an embodiment, the one or more similarity scores include a spatial similarity score and a semantic score. Such similarity scores may be indicative of a degree of similarity between the baseline image and the current image. In an embodiment, the one or more similarity scores include a spatial similarity score and a semantic similarity score. The semantic similarity score may be indicative of a similarity in the semantics of the one or more fields of the baseline image and the current image. Similarly, the spatial similarity score may be indicative of similarity in the spatial distribution of the one or more fields in the baseline image and the current image.

Such similarity scores may be used when the determined changes in the screen are semantic or spatial in nature. In an exemplary scenario, a semantic change may be determined based on comparison of a semantic score corresponding to the baseline image and the current image with a pre-defined semantic threshold. In an embodiment, the semantic similarity may be measured using a combination of world knowledge as well as domain specific similarity dictionaries. Such dictionaries may be stored in the memory 204 and may be configured or updated periodically.

In another exemplary scenario, a spatial change may be determined based on comparison of a difference in the spatial score corresponding to the baseline image and the current image with the pre-defined spatial threshold. Two items need to be under a reasonable threshold distance to be considered spatially similar. In an embodiment, once spatial similarity is established the semantic similarity is measured to infer if a new field is a replacement for original field.

In an embodiment, for determining a change in a layout of the screen, the field correlation module 220 may be configured to compare the data stored in the CSV file corresponding to the baseline image and the current image. In order to determine the change in screen resolution, the field correlation module 220 may be configured to compare the resolution of the baseline image and the current image. In order to determine an addition or a deletion of one or more fields in the current image with respect to the baseline image, the field correlation module 220 may be configured to compare the CSV files of the aforementioned images. The field correlation module 220 may be further configured to determine the changes relating to the addition or a deletion of one or more fields based on a hybrid object extraction mechanism. In an embodiment, the hybrid object extraction mechanism may be a combination of a semantic processing as well as an image comparison performed on the baseline image and the current image. The semantic processing may comprise determining a semantic similarity in the texts present in the current image and the baseline image. The image comparison may be based on one or more image processing techniques, such as OpenCV or Microsoft Office Document Imaging (MODI). In scenarios when the change in the compared CSV's is greater than a pre-defined threshold, the CSV of the current image may be updated based on the one or more fields of the current image that have changed with respect to the corresponding one or more fields of the baseline image.

Furthermore, based on the aforementioned determined changes, the field updation module 222 may be configured to update a current baseline image with the one or more fields of the current image. Also, the field updation module 222 may be further configured to update the relevant CSV file corresponding to the current image, based on the determined changes.

In an embodiment, the processor 202 may be configured to recommend, to the user 104, one or more updates corresponding to the one or more automation sequences, based on the determined change. The user 104 may subsequently update the one or more automation sequences accordingly, and the updated changes may be stored in the automation sequence database 106. In an embodiment, the processor 202 (by use of machine learning algorithms stored in the memory 204) may perform a machine learning on the feedback provided by the user 104, corresponding to the recommendations. As an example, whenever feedback is required from the user 104, the processor 202 may be configured to update the one or more automation sequences to accept the changes made by the user 104. In scenarios of semantic changes identified by the field correlation module 220, based on manual updation, a learning mechanism may semantically correlate one or more fields. For example, the processor 202 (or a BOT configured in the processor 202) may not initially correlate the fields, such as "Press Go" and "Submit". When the user 104 trains the BOT to update the sequence so as to accept both these fields as synonymous, then the BOT may automatically perform learning that includes treating the aforementioned fields as synonymous. In next iterations, whenever the BOT faces a similar sequence, it will automatically correlate the aforementioned fields.

Figure 3:
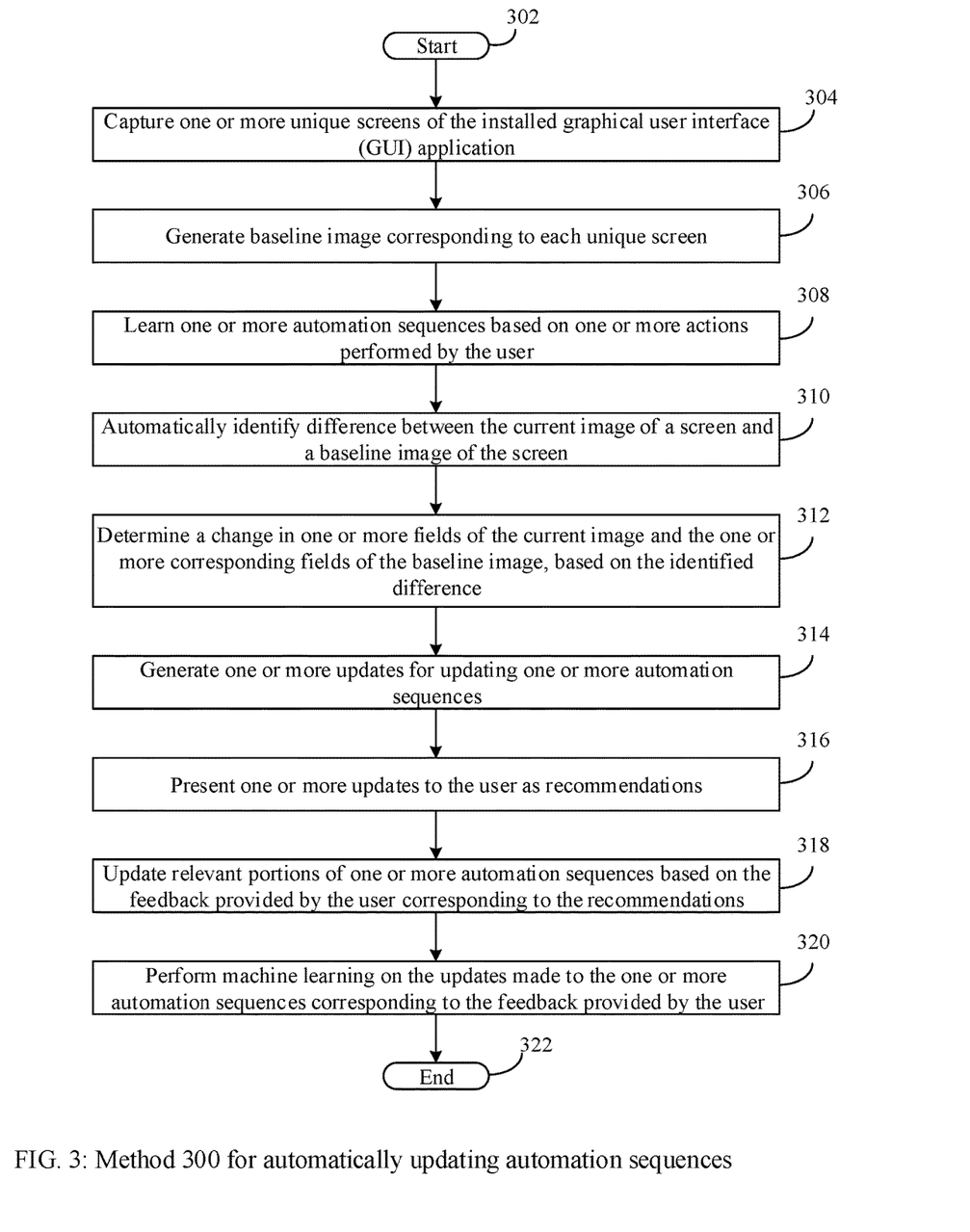
FIG. 3 is a flow diagram of a detailed exemplary process for automatically updating automation sequences, in accordance with some embodiments of the present disclosure.

FIG. 3 is a flow diagram of a detailed exemplary process for automatically updating automation sequences, in accordance with some embodiments of the present disclosure. With reference to FIG. 3, there is shown a flow chart 300. The flow chart 300 is described in conjunction with FIGS. 1 and 2. The process starts at step 302 and proceeds to step 304.

At step 304, one or more unique screens of the installed GUI application may be captured by the electronic device 102. At step 306, a baseline image may be generated corresponding to each unique screen, based on processing a unique screen of the GUI application to extract one or more fields from the unique screen. The data associated with the extracted one or more fields may be stored in an image database. At step 308, one or more automation sequences may be learnt by the electronic device based on the one or more actions performed by the user 104 on the installed GUI application. The one or more learnt automation sequences may be stored in the automation sequence database 106.

At step 310, a difference between the current image of a screen of the GUI application and the baseline image of the screen of the GUI application, based on one or more image comparison techniques, may be automatically identified by the electronic device 102. At step 312, a change in one or more fields of the current image and the one or more corresponding fields of the baseline image, based on the identified difference, may be determined. In an embodiment, the determined change may be based on one or more similarity scores or a comparison of corresponding CSV files of the baseline image and the current image.

At step 314, one or more updates may be generated for updating the one or more automation sequences may be updated based on the determined change. A step 316, the one or more updates may be presented to the user 104 as recommendations. At step 318, based on the feedback provided by the user 104, one or more relevant portions of the one or more automation sequences may be updated. In an alternate embodiment, the one or more relevant portions of the one or more automation sequences may be updated automatically by the electronic device 102. At step 320, a machine learning may be performed on the updates made to the one or more automation sequences, based on the feedback provided by the user 104. The control passes to the end step 322.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 4:
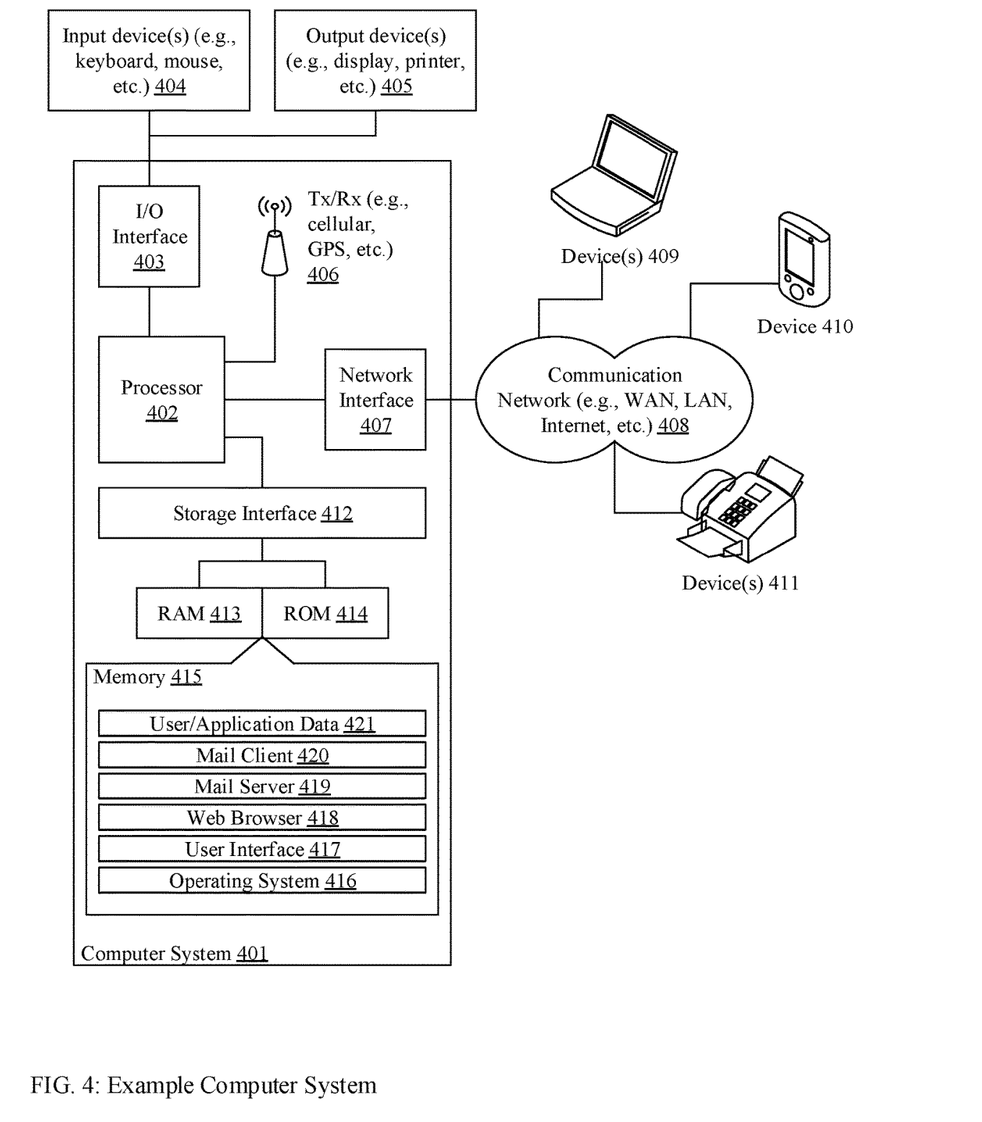
FIG. 4 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 4, a block diagram of an exemplary computer system 401 for implementing embodiments consistent with the present disclosure is illustrated. Variations of computer system 401 may be used for implementing network environment 100 for transmitting data over a communication network. Computer system 401 may include a central processing unit ("CPU" or "processor") 402. Processor 402 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., TEXAS INSTRUMENTS WiLink WL1283, BROADCOM BCM4750IUB8, INFINEON TECHNOLOGIES X-GOLD 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., APPLE IPHONE, BLACKBERRY, Android-based phones, etc.), tablet computers, eBook readers (AMAZON KINDLE, NOOK, etc.), laptop computers, notebooks, gaming consoles (MICROSOFT XBOX, NINTENDO DS, SONY PLAYSTATION, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, APPLE MACINTOSH OS X, UNIX, UNIX-like system distributions (e.g., BERKELEY SOFTWARE DISTRIBUTION (BSD), FREEBSD, NETBSD, OPENBSD, etc.), LINUX distributions (e.g., RED HAT, UBUNTU, KUBUNTU, etc.), IBM OS/2, MICROSOFT WINDOWS (XP, VISTA/7/8, etc.), APPLE IOS, GOOGLE ANDROID, BLACKBERRY OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, APPLE MACINTOSH operating systems' AQUA, IBM OS/2, MICROSOFT WINDOWS (e.g., AERO, METRO, etc.), UNIX X-WINDOWS, web interface libraries (e.g., ACTIVEX, JAVA, JAVASCRIPT, AJAX, HTML, ADOBE FLASH, etc.), or the like.

In some embodiments, the computer system 401 may implement a web browser 418 stored program component. The web browser may be a hypertext viewing application, such as MICROSOFT INTERNET EXPLORER, GOOGLE CHROME, MOZILLA FIREFOX, APPLE SAFARI, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE FLASH, JAVASCRIPT, JAVA, application programming interfaces (APIs), etc. In some embodiments, the computer system 401 may implement a mail server 419 stored program component. The mail server may be an Internet mail server such as MICROSOFT EXCHANGE, or the like. The mail server may utilize facilities such as ASP, ACTIVEX, ANSI C++/C#, MICROSOFT .NET, CGI scripts, JAVA, JAVASCRIPT, PERL, PHP, PYTHON, WEBOBJECTS, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as APPLE MAIL, MICROSOFT ENTOURAGE, MICROSOFT OUTLOOK, MOZILLA THUNDERBIRD, etc.

In some embodiments, computer system 401 may store user/application data 421, such as the data, variables, records, etc. (e.g., past ticket repository, keywords, Ngrams, clusters or categories, relationship mapping, user queries, resolutions, and so forth) as described in this disclosure. Such databases may be implemented as fault-tolerant, relational, scalable, secure databases such as ORACLE or SYBASE. Alternatively, such databases may be implemented using standardized data structures, such as an array, hash, linked list, struct, structured text file (e.g., XML), table, or as object-oriented databases (e.g., using OBJECTSTORE, POET, ZOPE, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for automatically updating automation sequences, thereby reducing the manual efforts required for constant upkeep and maintenance required for automation sequences because of frequent changes in the GUI application being tested. Additionally, the existing method and system also enable the users (specifically the software testing teams) in automatically adapting the automation sequences based on the various platforms on which the GUI application runs. For example, the user may not be required to especially create and automation sequence for various browsers. Based on the determined changes in the screens of the GUI application across various browsers, the aforesaid system may automatically update the automation sequence when the same GUI application is run on a different browser, thereby reducing the manual efforts required for generating and maintaining portable automation sequences. Furthermore, because the aforementioned method and system is based on machine learning, the resulting system increases the efficiency of the system in predicting appropriate updates that need to be made to the automation sequences based on the changes made in the GUI application.

The specification has described system and method for automatically updating automation sequences. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for automatically updating automation sequences, the method comprising:
   determining, by a computing device, a version identifier of a current version of a graphical user interface (GUI) application;
   determining, by the computing device, that the version identifier of the current version of the GUI application is different than a version identifier of a baseline version of the GUI application;
   in response to determining that the version identifier of the current version of the GUI application is different, acquiring, by the computing device, a current image of a screen of the current version of the GUI application and a baseline image of a screen of the baseline version of the GUI application, wherein each of the current image and the baseline image comprise one or more fields;
   further in response to determining that the version identifier of the current version of the GUI application is different, performing, by the computing device, one or more image comparison techniques on the current image of and the baseline image and further performing one or more comparisons of data stored in one or more comma separated value (CSV) files associated with the current image and the baseline image;
   automatically identifying, by the computing device, a difference between the current image and the baseline image, based on the one or more image comparison techniques and the comparisons of the one or more CSV files;
   in response to identifying the difference between the current image and the baseline image, calculating, by the computing device, a spatial similarity score and a semantic similarity score indicative of a degree of similarity between the current image and the baseline image and, based on the calculated spatial similarity score and the calculated semantic similarity score, performing, by the computing device, a weighted analysis of comparison of each of the spatial similarity score and the semantic similarity score with a corresponding threshold;
   determining, by the computing device, a change in the one or more fields of the current image and the one or more corresponding fields of the baseline image, based on the spatial similarity score, the semantic similarity score, and the weighted analysis; and
   updating, by the computing device, the one or more automation sequences based on the determined change.

2. The method of claim 1, wherein the baseline image is generated based on:
   processing, by the computing device, a unique screen of the GUI application to extract one or more fields from the unique screen, and storing, by the computing device, data associated with the extracted one or more fields in a database.

3. The method of claim 2, wherein the change is further determined based on correlating data associated with the one or more fields of the current image and the stored data associated with the one or more fields of the baseline image.

4. The method of claim 1, wherein the change corresponds to at least one of: a change in a resolution of the screen of the GUI application, an addition of one or more fields to the screen of the GUI application, a deletion of one or more fields from the screen of the GUI application, a change in a spatial arrangement of one or more fields of the screen of the GUI application, or a semantic change of one or more fields of the screen of the GUI application.

5. The method of claim 1, wherein the one or more automation sequences comprise at least: a set of actions performed on one or more fields of the GUI application, a set of pre-conditions of the one or more fields on which the one or more actions are performed, or a set of post-conditions of the GUI application after the one or more actions are performed.

6. The method of claim 1, wherein the one or more automation sequences are pre-recorded.

7. The method of claim 1, further comprising recommending, by the computing device, one or more updates corresponding to the one or more automation sequences, based on the determined change.

8. The method of claim 7, further comprising performing, by the computing device, machine learning on the user feedback corresponding to the recommendations.

9. A system for automatically updating automation sequences, the system comprising:
   a processor; and
   a memory communicatively coupled to the processor, wherein the memory stores the processor-executable instructions, which, on execution, causes the processor to perform the steps of:
      determining, by a computing device, a version identifier of a current version of a graphical user interface (GUI) application;
      determining that the version identifier of the current version of the GUI application is different than a version identifier of a baseline version of the GUI application;
      in response to determining that the version identifier of the current version of the GUI application is different, acquiring a current image of a screen of the current version of the GUI application and a baseline image of a screen of the baseline version of the GUI application, wherein each of the current image and the baseline image comprise one or more fields;
      further in response to determining that the version identifier of the current version of the GUI application is different, performing one or more image comparison techniques on the current image of and the baseline image and further performing one or more comparisons of data stored in one or more comma separated value (CSV) files associated with the current image and the baseline image;
      automatically identifying, by the computing device, a difference between the current image and the baseline image, based on the one or more image comparison techniques and the comparisons of the one or more CSV files;

in response to identifying the difference between the current image and the baseline image, calculating a spatial similarity score and a semantic similarity score indicative of a degree of similarity between the current image and the baseline image and, based on the calculated spatial similarity score and the calculated semantic similarity score, performing a weighted analysis of comparison of each of the spatial similarity score and the semantic similarity score with a corresponding threshold;

determining a change in the one or more fields of the current image and the one or more corresponding fields of the baseline image, based on the spatial similarity score, the semantic similarity score, and the weighted analysis; and updating the one or more automation sequences based on the determined change.

10. The system of claim 9, wherein the processor is configured to generate baseline image based on:

processing a unique screen of the GUI application to extract one or more fields from the unique screen, and storing data associated with the extracted one or more fields in a database.

11. The system of claim 10, wherein the processor is configured to further determine the change based on correlating data associated with the one or more fields of the current image and the stored data associated with the one or more fields of the baseline image.

12. The system of claim 9, wherein the processor is further configured to recommend, to a user, one or more updates corresponding to the one or more automation sequences, based on the determined change.

13. The system of claim 12, wherein the processor is further configured to perform machine learning on the feedback provided by the user corresponding to the recommendations.

14. A non-transitory computer-readable medium storing instructions for automatically updating automation sequences, wherein upon execution of the instructions by one or more processors, the processors perform operations comprising:

determining a version identifier of a current version of a graphical user interface (GUI) application;

determining that the version identifier of the current version of the GUI application is different than a version identifier of a baseline version of the GUI application;

in response to determining that the version identifier of the current version of the GUI application is different, acquiring a current image of a screen of the current version of the GUI application and a baseline image of a screen of the baseline version of the GUI application, wherein each of the current image and the baseline image comprise one or more fields;

further in response to determining that the version identifier of the current version of the GUI application is different, performing one or more image comparison techniques on the current image of and the baseline image and further performing one or more comparisons of data stored in one or more comma separated value (CSV) files associated with the current image and the baseline image;

automatically identifying a difference between the current image and the baseline image, based on the one or more image comparison techniques and the comparisons of the one or more CSV files;

in response to identifying the difference between the current image and the baseline image, calculating a spatial similarity score and a semantic similarity score indicative of a degree of similarity between the current image and the baseline image and, based on the calculated spatial similarity score and the calculated semantic similarity score, performing a weighted analysis of comparison of each of the spatial similarity score and the semantic similarity score with a corresponding threshold;

determining a change in the one or more fields of the current image and the one or more corresponding fields of the baseline image, based on the spatial similarity score, the semantic similarity score, and the weighted analysis; and updating the one or more automation sequences based on the determined change.

* * * * *